US012509114B2

(12) United States Patent
Bohnsack et al.

(10) Patent No.: US 12,509,114 B2
(45) Date of Patent: Dec. 30, 2025

(54) METHOD OF SUPERVISED OPERATION OF A VEHICLE WITH AUTONOMOUS DRIVE CAPABILITY

(71) Applicant: Einride AB, Stockholm (SE)

(72) Inventors: Erik Bohnsack, Stockholm (SE); Christian Larsson, Stockholm (SE)

(73) Assignee: Einride AB, Stockholm (SE)

( * ) Notice: Subject to any disclaimer, the term of this patent is extended or adjusted under 35 U.S.C. 154(b) by 0 days.

(21) Appl. No.: 18/614,707

(22) Filed: Mar. 24, 2024

(65) Prior Publication Data
US 2024/0319732 A1   Sep. 26, 2024

(30) Foreign Application Priority Data

Mar. 24, 2023   (EP) .................................... 23164132

(51) Int. Cl.
G05D 1/222 (2024.01)
B60W 60/00 (2020.01)
G05D 1/646 (2024.01)
G05D 109/10 (2024.01)
G07C 5/00 (2006.01)

(52) U.S. Cl.
CPC .......... B60W 60/001 (2020.02); G05D 1/222 (2024.01); G05D 1/646 (2024.01); G07C 5/008 (2013.01); G05D 2109/10 (2024.01)

(58) Field of Classification Search
CPC .... G05D 1/222; G05D 1/646; G05D 2109/10; G05D 2105/28; G05D 1/2247; G05D 2107/13; G05D 1/227; G05D 1/644; B60W 60/001; B60W 2552/53; B60W 2554/801; B60W 30/09; B60W 30/12; B60W 60/00; G07C 5/008
See application file for complete search history.

(56) References Cited

U.S. PATENT DOCUMENTS

| 2018/0154899 A1 | 6/2018 | Tiwari et al. |
| 2018/0267537 A1* | 9/2018 | Kroop .................. B60W 30/10 |
| 2019/0015976 A1* | 1/2019 | Sweeney ............... B25J 9/1602 |
| 2019/0056741 A1* | 2/2019 | Zych ..................... B60Q 5/006 |
| 2019/0094868 A1* | 3/2019 | Zych ..................... G05D 1/0077 |
| 2023/0032713 A1 | 2/2023 | Kothbauer et al. |

FOREIGN PATENT DOCUMENTS

DE        102021101225 A1   7/2022

OTHER PUBLICATIONS

European Search Report and Written Opinion dated Jul. 20, 2023 received in European Patent Application No. EP 23164132.5.

* cited by examiner

*Primary Examiner* — Nga X Nguyen
(74) *Attorney, Agent, or Firm* — SCULLY, SCOTT, MURPHY & PRESSER, P.C.

(57) ABSTRACT

A method of operating an autonomous vehicle in a supervised autonomous mode is disclosed. A supervised autonomous mode can include the steps of receiving a vehicle data from a vehicle, presenting vehicle data at a remote station, receiving a supervisor input from a supervisor input device at the remote station, converting the supervisor input into a nudge for the motion planner of the vehicle associated with the received first set of vehicle data, wherein the nudge at least includes information on how to modify one or more elements of the cost function of the motion planner and transmitting the nudge from the remote station to the motion planner such that the nudge at least temporarily updates a cost function based model of the motion planner based on the nudge.

6 Claims, 8 Drawing Sheets

METHOD OF SUPERVISED OPERATION OF A VEHICLE WITH AUTONOMOUS DRIVE CAPABILITY

CROSS-REFERENCE TO RELATED APPLICATION

This application claims priority under 35 U.S.C. § 119 to European Patent Application No. EP 23164132, filed on Mar. 24, 2023. The entire disclosure of European Patent Application No. EP 23164132 is incorporated by reference herein.

TECHNICAL FIELD

The present disclosure related in general to methods of operating a vehicle having autonomous driving capability, a vehicle and a remote station.

BACKGROUND

Handovers between vehicles driving autonomously and remote operators controlling the motion of a vehicle are currently problematic. For example, when two regulators act in different ways with different inputs and outputs (simply human vs. autonomous), guaranteeing transfer of smooth regulation upon switch of regulators may be difficult.

Additionally, while autonomous technology is being developed, both commercially active and test autonomous vehicles may not be able to handle all situations in an optimal manner. Currently, if an autonomous vehicle encounters a situation where it does not know how to proceed it will require operation being taken over by a remote driver or a safety driver. Similarly, an autonomous vehicle may be able to handle certain situations in an acceptable manner, but not an optimal manner where they could benefit from some external help.

Accordingly, there exists a need in the field of autonomous capable vehicles to have a supervised autonomous mode where control of the vehicle remains under the regulation of the autonomous systems but where a supervisor can provide input to the system to handle a situation, for example in real time, without taking over any control of the vehicle.

SUMMARY

It is an object to overcome at least some of the above-mentioned problems, and to provide an improved method of operating an at least partly autonomous vehicle.

An aspect of the present disclosure described herein is to provide a method of operating an autonomous vehicle in a supervised autonomous mode.

Such a method can be obtained, for example, by receiving a first set of vehicle data from a vehicle, the vehicle being configured to operate in an autonomous mode following a trajectory determined by a motion planner using a cost function based model in combination with vehicle data, at a remote station, presenting the received first set of vehicle data at the remote station, receiving a supervisor input from a supervisor input device at the remote station upon having presented the first set of vehicle data, converting the supervisor input into a nudge for the motion planner of the vehicle associated with the received first set of vehicle data, wherein the nudge at least includes information on how to modify one or more elements of the cost function of the motion planner, transmitting the nudge from the remote station to the motion planner, at least temporarily updating the cost function based model of the motion planner based on the nudge, and continuously operating the vehicle in the supervised autonomous mode, wherein the vehicle autonomously follows the trajectories from the motion planner continuously before and after receiving a nudge.

According to another aspect of the present disclosure described herein there is a system having a control unit configured to provide a method of operating an autonomous vehicle in a supervised autonomous mode.

Still yet, there is disclosed herein a remote station having a user input and control unit configured to provide a method of operating an autonomous vehicle in a supervised autonomous mode.

There is also disclosed herein a vehicle which can be operated in at least an autonomous drive mode and a supervised autonomous drive mode.

A supervised autonomous mode can be where an operator is capable of providing an input to the system which is capable of influencing the system but, for example, not directly controlling a vehicle.

Operating a vehicle in a supervised autonomous mode can include a number of steps.

A motion planner can be included in the vehicle. A motion planner can be included in a second vehicle. A motion planner can be included in a cloud system.

A motion planner can be considered as a computer or a control unit that is connected to the vehicle and the remote station, but not necessarily physically part of either of the two.

Motion planners can use a cost function based model. The cost function based model can be used in combination with vehicle data. The cost function can be used in combination with vehicle data collected at different times.

A step of the supervised autonomous mode can be converting supervisor input into a nudge for a motion planner of the vehicle. A nudge can include information on how to modify an element of a cost function of a motion planner, for example how a weighting of a factor of the cost function should be increased or decreased.

BRIEF DESCRIPTION OF THE DRAWINGS

These and other aspects will now be described in more detail, with reference to the appended drawings.

DETAILED DESCRIPTION

In the following detailed description, some embodiments of the present disclosure will be described. However, it is to be understood that features of the different embodiments are exchangeable between the embodiments and can be combined in different ways, unless anything else is specifically indicated. Even though in the following description, numerous details are set forth, it will be apparent to one of ordinary skill in the art that embodiments of the present disclosure can be practices without these details. In other instances, well known constructions or functions are not described in detail.

Figure 1:
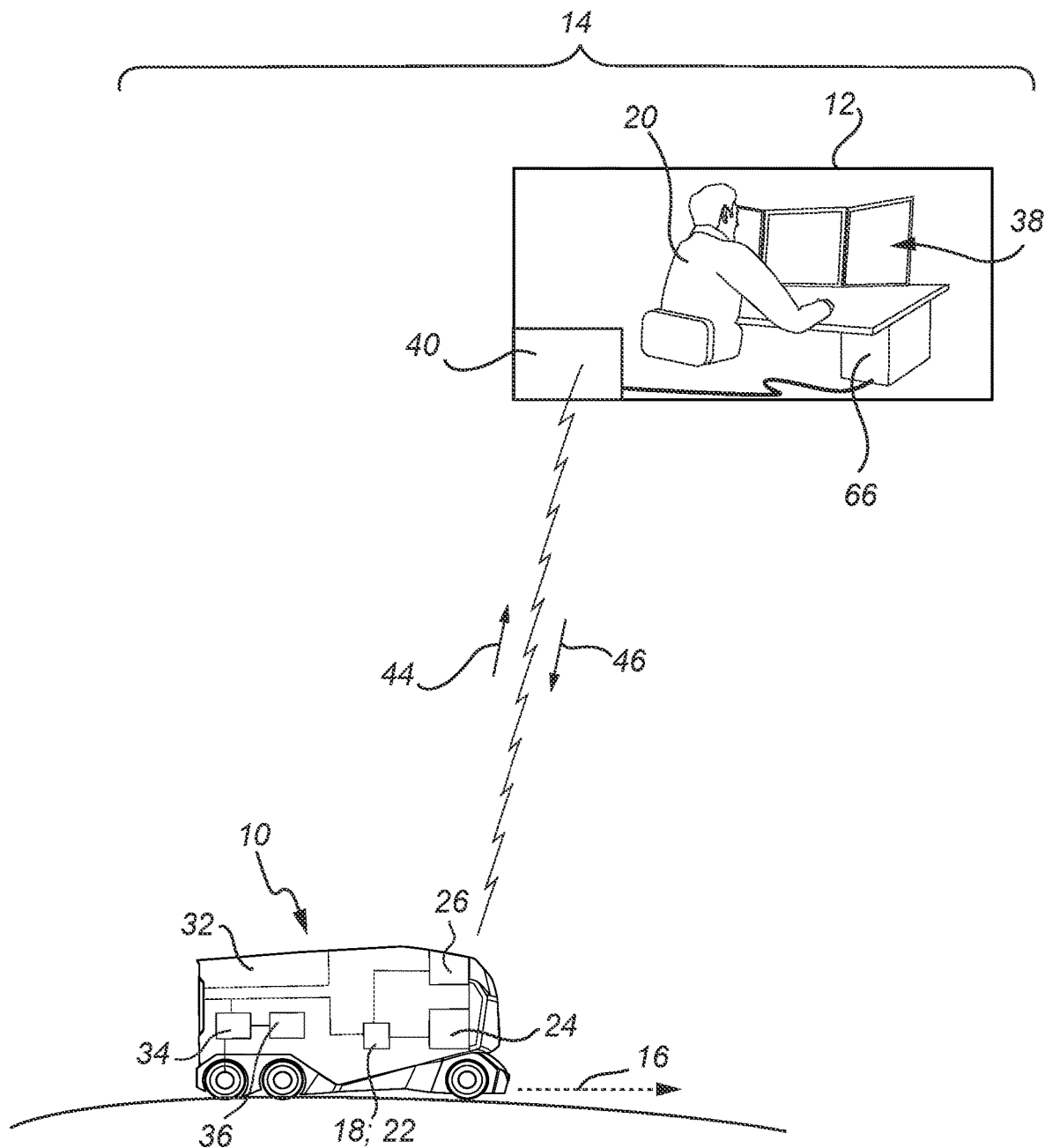
FIG. 1 schematically illustrates a vehicle and a remote station.

FIG. 1 illustrates a vehicle 10 having autonomous driving capability and a remote operation station 12. A vehicle 10 and a remote station 12 can together form (part of) a system 14.

A vehicle 10 can be a (wheeled) road vehicle, such as a heavy duty truck, an electric truck, an electric heavy duty truck, a tractor, or a tractor-trailer combination.

A vehicle 10 can have several different driving modes that the vehicle 10 can switch between. Driving modes can include an autonomous drive mode. An autonomous drive mode can be wherein a vehicle 10 autonomously steers and applies throttle/braking (acceleration/deceleration). An autonomous drive mode can be such that a vehicle follows a trajectory 16.

A trajectory can be calculated by a motion planner 18 for a vehicle.

A driving mode can be a remote driving mode. A remote driving mode can be wherein a remote operator 20 controls a vehicle's 10 steering and throttle/braking application. A remote operator can remotely operate a vehicle in remote driving mode from, for example, a remote station 12. A remote operator 20 can also be referred to as a teleoperator or remote driver.

A driving mode can be a supervised autonomous mode. A supervised autonomous mode can correspond to an autonomous mode in which a remote supervisor can monitor a vehicle and/or its surroundings. A remote supervisor can evaluate a vehicle's current situation and provide input to a motion planner of the vehicle. An input can influence a model of a motion planner such that how the motion planner determines where and/or how a vehicle should drive can be adjusted. A supervisor input can therefore not directly command a vehicle to take a certain action or change its driving behavior, which can correspond to a remote mode where an operator assumes control of the vehicle. Instead, the motion planner and/or the vehicle are still in control of how the vehicle operates. Thus, the motion planner and/or vehicle can therefore be responsible for the operation of the vehicle in a supervised autonomous mode.

The terms autonomous driving mode, autonomous drive mode, and autonomous mode can be used interchangeably. The terms fully remote driving mode, remote driving mode, remote drive mode, and remote mode can be used interchangeably. The terms supervised autonomous driving mode, supervised autonomous drive mode, and supervised autonomous mode can be used interchangeably.

The terms online motion planner and motion planner can be used interchangeably.

The remote operator can be referred to as and/or synonymous with a remote supervisor, for example when the vehicle is operating in an autonomous mode or supervised autonomous mode.

Vehicles can be driven, for example, in four distinct ways. The first is completely controlled by a human. This can be with a human in the vehicle in a classic fashion (hands on steering wheel and feet on brake/accelerator) or with a remote driver who controls inputs to a steering function and a braking/acceleration function (as in the above-mentioned fully remote driving mode). There are many examples of this which are self-evident to one of ordinary skill in the art. In this way both the responsibility for driving and the actions of driving are completely controlled by a human driver.

A second distinct way of operating a vehicle is where the responsibility for driving is completely with the human driver but where a limited number of functions or actions are controlled directly by a computer. These are commonly known as ADAS or Advanced Driver Assistance Systems. These can be lane keep, where the vehicle steering may be at least partially controlled by a computer to keep a driver from deviating from a lane while driving. Another example is ACC or automatic cruise control where the acceleration of the vehicle is at least partially controlled by a computer to keep the vehicle at a predetermined distance from another vehicle or object. In these cases, while a computer is responsible for making a subset of driving decisions, ultimate responsibility for the vehicle rests with the driver. These systems can "easily" be overrode by a driver by the driver providing an input to the vehicle through their normal input device (remote control, brake pedal, acceleration pedal, steering wheel, etc.).

A third distinct way of operating a vehicle is autonomously, like the aforementioned autonomous drive mode. During autonomous operation one or more computers make all of the driving decisions, all of the responsibility for driving rests with the autonomous system and no direct driver input is possible. Essentially, as soon as there is any direct driver input, e.g., a command to slow, speed up or turn left/right, then the system is described with the second distinct way above where responsibility for the vehicle (for at least the moment of the command/shift) is transferred to the human who made the input. This is logical as if a vehicle is driving autonomously and impacts a vehicle in front of it, no human driver can be considered to be at fault. Similarly, if a driver or remote operator inputs a command to speed up, and that action results in an impact with a vehicle in front, the human who made the command would necessarily have the responsibility.

A fourth distinct way of operating a vehicle is a supervised autonomous mode. In a supervised autonomous mode a vehicle operates autonomously as described above while still allowing for human supervision and oversight. The supervision and/or oversight can be facilitated in several ways which is described in more detail herein. An example of the supervision in an autonomous operation is by creating and implementing nudges.

A vehicle 10 can include at least one computer 22 for (autonomous/remote) operation of the vehicle 10, various sensors 24 to detect the surroundings of the vehicle 10, and wireless communication means 26 (e.g., a transceiver configured to communicate using the 5G protocol) to communicate with the remote station 12.

An online motion planner 18 can be incorporated in a computer 22.

Sensors 24 can for example be configured to provide sensor data. Sensor data can for example include a video feed.

Figure 2:
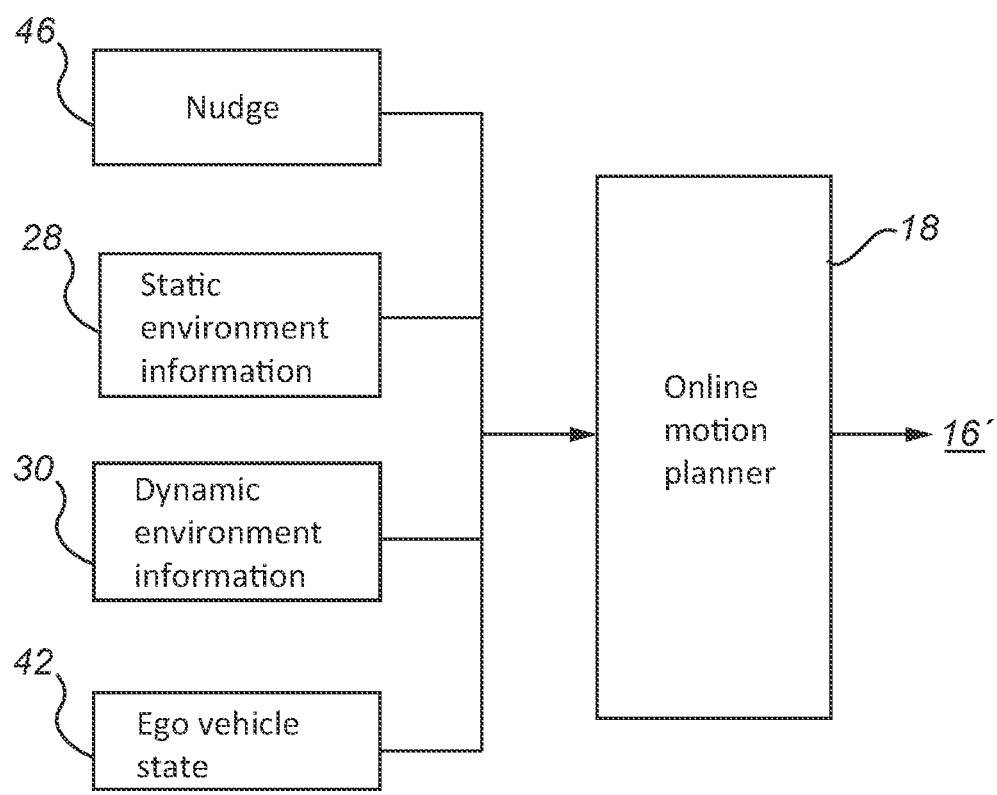
FIG. 2 is a block diagram of part of the vehicle.

Sensors 24 can also be used to provide sensor data such as static environment information 28 and dynamic environment information 30 (see FIG. 2). Static environment information 28 can include lane lines, static obstacles, signs, traffic lights, etc. Dynamic environment information 30 can include information about other road users/actors, e.g. vehicles, pedestrians, bicyclists, etc.

Sensors 24 can include cameras, radar, Lidar, etc.

Wireless communication means 26 can include a transmitter and a receiver. A transmitter and a receiver can be combined in a transceiver.

Wireless communication means 26 can for example be used to send at least some sensor data to a remote station 12 and to receive various commands and other input from a remote station 12.

A vehicle 10 can be a transport vehicle, with a trailer or compartment 32 for pallets, timber, perishable goods, etc.

A vehicle 10 can be an all-electric vehicle, propelled by at least one electric motor 34 powered by a battery pack 36.

A vehicle 10 can be devoid of a driver's cab, thereby it cannot be driven manually by a driver in the vehicle 10.

A remote station 12 can accommodate a remote operator 20.

A remote station 12 can comprise equipment 38 for allowing a remote operator 20 for example to remotely drive a vehicle 10. Equipment 38 can include one or more screens for showing the surroundings of a vehicle 10 (for example as detected by one or more sensors 24), steering means (for example a steering wheel), throttle, braking means, etc.

A remote station 12 can also have communication means 40 for wirelessly communicating with a vehicle 10, for example receiving at least some sensor data from the vehicle 10 and transmitting various commands and other input to the vehicle 10.

A computerized method of operating a vehicle will now be described, with further reference to FIGS. 2-3. The method can be computer-implemented, using e.g., the aforementioned computer(s) 22 and/or online motion planner 18.

At S1, a vehicle 10 can operate in an autonomous drive mode where at least steering, braking and acceleration decisions are made entirely autonomously by the vehicle 10, and wherein the vehicle 10 autonomously follows a trajectory 16 from an online motion planner 18.

A trajectory 16 can include a path indicating to a vehicle 10 how it should steer, and a speed profile indicating to the vehicle 10 how it should travel the path with respect to time (throttle/acceleration and braking/deceleration) to reach a destination.

A trajectory 16 can be determined by an online motion planner 18 based on a destination, static environment information 28 and dynamic environment information 30, as well as state information of a vehicle 10 (ego vehicle state 42).

An ego vehicle state 42 can include location, velocities, orientation, acceleration, etc.

While a vehicle is operating in autonomous drive mode (step S1), sensor data 44 and/or corresponding information can be sent from the vehicle 10, by wireless communication means 26, to a remote station 12, in step S2.

Sensor data 44 can be sent from a vehicle 10 via an external system (not shown) managing the transfer to/from a remote station 12. Sensor data 44 can include a live video feed from at least a front facing camera of sensors 24 of a vehicle 10, but can include other sensor data as well.

A live video feed can be displayed on one or more screens of remote station equipment 38.

Figure 3:
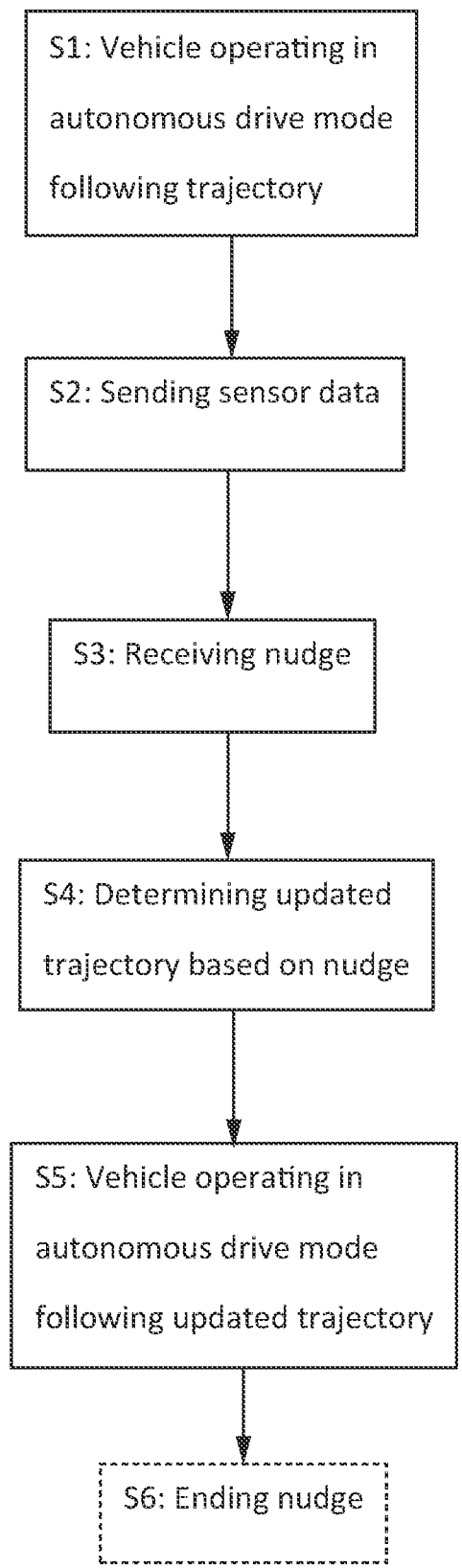
FIG. 3 is a flow chart of a method.

At S3, the method in FIG. 3 can comprise receiving a nudge 46 from a remote station 12, for example via wireless communication means 26. A nudge can be received (and processed) in real time by a vehicle 10 and/or a motion planner, while a vehicle 10 is operating in a supervised autonomous drive mode.

A nudge 46 can be indirectly based on sensor data 44. A nudge can serve as an input to an online motion planner 18. For example, a nudge 46 can be based on input from a remote operator 20 e.g., watching a live video feed on screen(s) of a remote station equipment 38. An input can be entered by a remote operator 20 using any input means of a remote station equipment 38, such as a keyboard or keypad, a joystick, computer mouse, touch screen, a steering wheel, an accelerator pedal, a brake pedal, etc.

In one example, an operator can explicitly select what kind of nudge to transmit. For example, this can be achieved by presenting a menu at the remote station with certain predefined selections available that the operator can choose from. One selection can be to encourage overtaking. One selection can be to increase or decrease distance to other vehicles and/or objects. One selection can be to increase or decrease speed.

In one example, a remote station can detect an operator input and automatically determine what kind of nudge to transmit. For example, this can be achieved by an operator pushing a joystick forward, or pressing down on an accelerator pedal, which a remote station can determine is an intent to increase speed. An operator pushing a joystick backwards, or pressing down on a brake pedal, can be determined to be an intent to decrease speed. An operator pushing a joystick diagonally forward can be determined to be an intent of overtaking another vehicle.

In one example, an operator can combine different inputs to select or indicate what kind of nudge to send. For example, an operator can hold down a button while moving a joystick to the side to indicate an intent to overtake another vehicle.

At S4, an online motion planner 18 can determine an updated trajectory 16' for a vehicle 10 in the supervised autonomous drive mode based at least on a nudge 46 and on sensor data from the vehicle 10. A nudge 46 can temporarily modify at least one constraint within an online motion planner 18.

Sensor data, such as the sensor data in step S4, can include (current) static environment information 28 and (current) dynamic environment information 30.

An updated trajectory 16' can be based on (current) ego vehicle state 42, as indicated in FIG. 2.

Figure 4A:
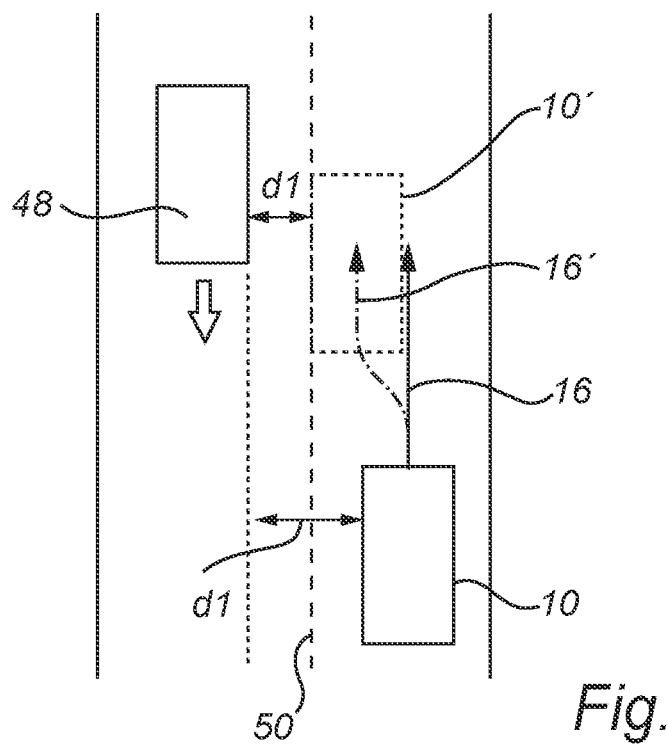
FIGS. 4a-d illustrate exemplary updated trajectories.

In one example illustrated in FIG. 4a, a constraint can be lateral margin (e.g. distance) d1 to a passing vehicle 48, which can influence the possible and/or feasible and/or cost-efficient drivable area in a cost function of an online motion planner 18. If a remote operator 20 sees on a video feed/sensor data 44 that a vehicle 10 is in a tight traffic situation and that a current speed of the vehicle 10 is relatively low, a nudge 46 can temporarily reduce a cost associated with the lateral margin d1 to the passing vehicle 48, so that the motion planner can provide an updated trajectory to the vehicle 10, so the vehicle 10 can drive closer than normal to the passing vehicle 48 (as indicated by updated trajectory 16'), which for example can be advantageous if there is some obstacle on the right hand side of the road. That is, the possible drivable area can be increased (safety margins around the other vehicle 47 decrease upon nudge 46).

A constraint can be an element of a cost function based model of a motion planner.

It should be noted that a nudge 46 is not a direct steering command (e.g. "steer left") to a vehicle 10, but rather a suggestion to change an autonomous driving behavior (for example, reduced lateral margin d to passing vehicles such as vehicle 48). It should also be noted that a vehicle 10 and/or a motion planner should remain in charge of decision making related to determining and following a trajectory, which can mean that the vehicle and/or the motion planner will still take the available information and sensor data into account in the cost function. Therefore, a nudge does not necessarily have to result in a vehicle, for example, driving closer to a passing vehicle even though the nudge decreased a cost of doing so.

For instance, as in the example of FIG. 4a, static environment information 28 and/or dynamic environment information 30 related to a vehicle's 10 position relative to a center line 50 of a road could indicate that if the vehicle 10 drives closer to a passing vehicle 48, which has a lower relative cost in a cost function after a nudge, the vehicle 10 would cross the center line 50, which has a corresponding cost in the cost function, whereby the vehicle 10 and/or motion planner can determine a trajectory based on available sensor data and information, wherein the trajectory does not necessarily direct the vehicle closer to the passing vehicle. Other exemplary nudges 46 are discussed hereinbelow.

An analogy would be where there is a student driver in a car. An instructor can be next to the student driver and provide supervision. When the student driver goes too fast in a certain instance (even if it is within a speed limit), the instructor only has two options. One is to give advice to the student driver to slow down (analogous to the techniques described in the present disclosure). In this instance control of the vehicle remains with the student driver and they can choose to speed up or slow down based on everything else going on around them. Alternatively the instructor can themselves engage a second or emergency brake to take over control of the vehicle (analogous to the above-mentioned direct command).

At S5, a vehicle can operate (still) in a supervised autonomous drive mode by following an updated trajectory 16' from an online motion planner 18, as for example illustrated by reference sign 10' in FIG. 4a. That is, despite receiving a nudge 46, a vehicle 10 does not switch from a supervised autonomous drive mode throughout steps S1-S5. In other words, a vehicle 10 can operate continuously in a supervised autonomous drive mode, without direct driving instructions from a remote operator 20, by following an updated trajectory 16' from an online motion planner 18.

A trajectory 16' can be regularly updated, e.g. taking into account any new static and/or dynamic environment information 28, 30 and/or any new ego vehicle state information 42.

In one example, input from the operator is converted into a nudge which is transmitted to a vehicle/and or motion planner in real time which can update a model of the motion planner in real time. How a vehicle responds to an updated trajectory can be presented in real time at a remote station based on continuously received vehicle data. An operator can then keep providing input or adjust the input based on how the vehicle operates, as presented at the remote station.

Overall, the method S1-S5 can provide seamless and safe integration of an autonomous drive mode and a remote operator 20 into a supervised autonomous mode, combining the strength of human and machine perception, and for example enabling driving of an autonomous vehicle 10 in situations where machine perception alone is not sufficient.

At optional step S6, a nudge 46 can be ended when a remote operator 20 releases a used input means of a remote station equipment 38. For example, as shown in FIG. 4a, an input from a remote operator 20 can be a joystick press to the left. The nudge can end when the operator 20 stops pressing to the left, such as after passing the vehicle 48 completely.

Figure 4B:
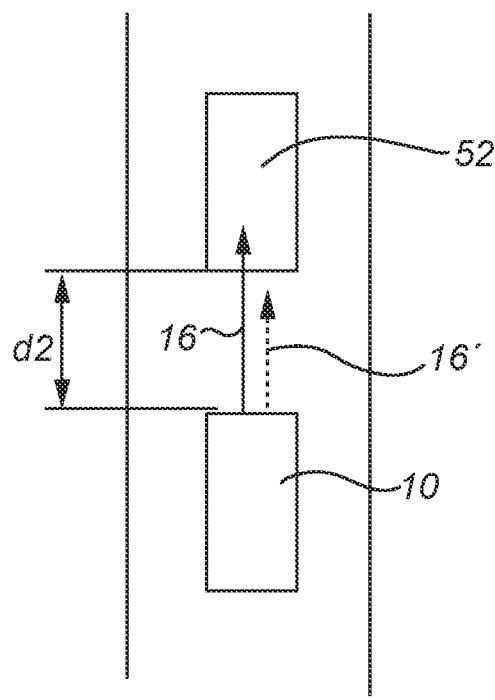

A nudge 46 can include an indication of a constraint (within the online motion planner 18) to be modified and a manner in which to modify a constraint, as exemplified for lateral margin d1 in FIG. 4a. For example there can be a step which is responsible for translating and/or converting a message to an actual modification of the constraints in the motion planner. Such examples are discussed throughout. One example is that there can be a hard mapping between a high-level data structure to motion planner constraints. Constraints here can be factors, elements or other pieces discussed herein. Another example can be where context of an environmental state can be included in the translating and/or converting of an input or a message to a modification of the constraints and/or nudge In another example illustrated in FIG. 4b, a constraint can be margin (e.g. distance) d2 to a vehicle 52 in front, whereby the nudge 46 for example can include that the margin d2 should be temporarily reduced (as indicated by the updated, "shorter" trajectory 16'), for example down to 1 meter, for example when the vehicle 10 is in a traffic jam as can be detected by a remote operator 20 from a video feed/sensor data 44. In another scenario there is a car in front of a vehicle 10 in the same lane, but also an oncoming car. The oncoming car needs to go over in the vehicle's 10 lane due to unforeseen circumstances (such as a stopped car in its lane). A nudge 46 can here include that the margin d2 should be temporarily reduced where to go closer than normal to the car in front to let the oncoming car get more space behind vehicle 10.

Figure 4C:
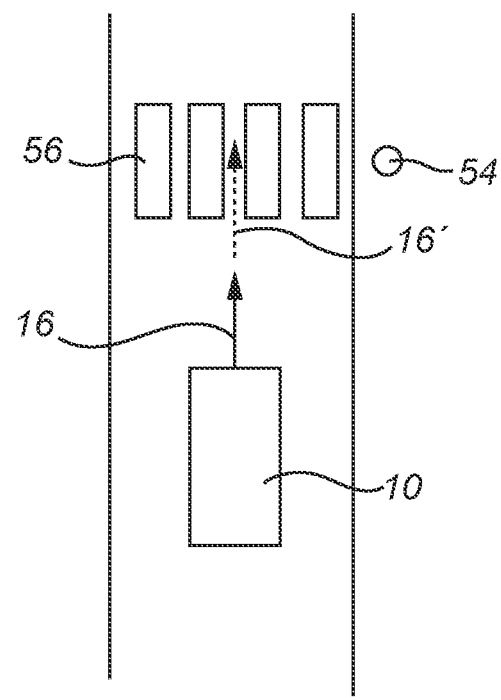

In another example illustrated in FIG. 4c, a constraint can be a safety margin for another object's potential movement, such as a pedestrian 54 nearby a pedestrian crossing 56. An online motion planner 18 can normally be careful near a pedestrian 54, with a high safety margin. However, if a remote operator 20 can clearly see from a video feed/sensor data 44 that the pedestrian 54 is not going to cross the crossing 56, a nudge 46 can be transmitted and received by the vehicle 10 and/or motion planner and include that the safety margin can be temporarily reduced. For example, an input can be the selection of a behavioral attribute or expectation of the object, which in this case is the pedestrian 54. An input could be, for example, selecting on a touch screen the pedestrian 54, or a box or other element representing the pedestrian, and then selecting on the touch screen a behavior. Such a behavior could be, for example, from a drop down list including options. Example options could be, stand, go, walk, run, act erratically, jaywalk, wait for light, wait for vehicle, walk in front of vehicle, child. By selecting the pedestrian and input an expected and/or perceived behavior from the supervisor, then a nudge can be created by the system. The nudge may take into account the environmental state, the relative distances between the vehicle and the pedestrian, distances between the pedestrian and other objects/vehicles, an expected behavior or behaviors from one or more behavioral models, and the input expected behavior by the supervisor. Based on the inputs to the nudge formation, the nudge can then be created as an input to a motion planner in a specific format for creating the desired modifications to the motion planner, A reduced safety margin can for example result in that the vehicle 10 can pass a pedestrian 54 and crossing 56 in the supervised autonomous drive mode without lowering its speed (as indicated by the updated, "longer" trajectory 16').

For example, a predictive path algorithm of the online motion planner 18 can be influenced by the nudge 46.

For example, a predictive path algorithm can estimate the likelihood of a pedestrian crossing the crossing, and an online motion planner consequently determines an appropriate speed of a vehicle based on this likelihood. A nudge from a remote operator indicating that the pedestrian will not cross the crossing, or is very unlikely to do so, could then alter one or more weighting factors of the predictive path algorithm, thereby influencing how the online motion planner determines a desired trajectory, which can include a speed of the vehicle, based on sensor data.

Figure 4D:
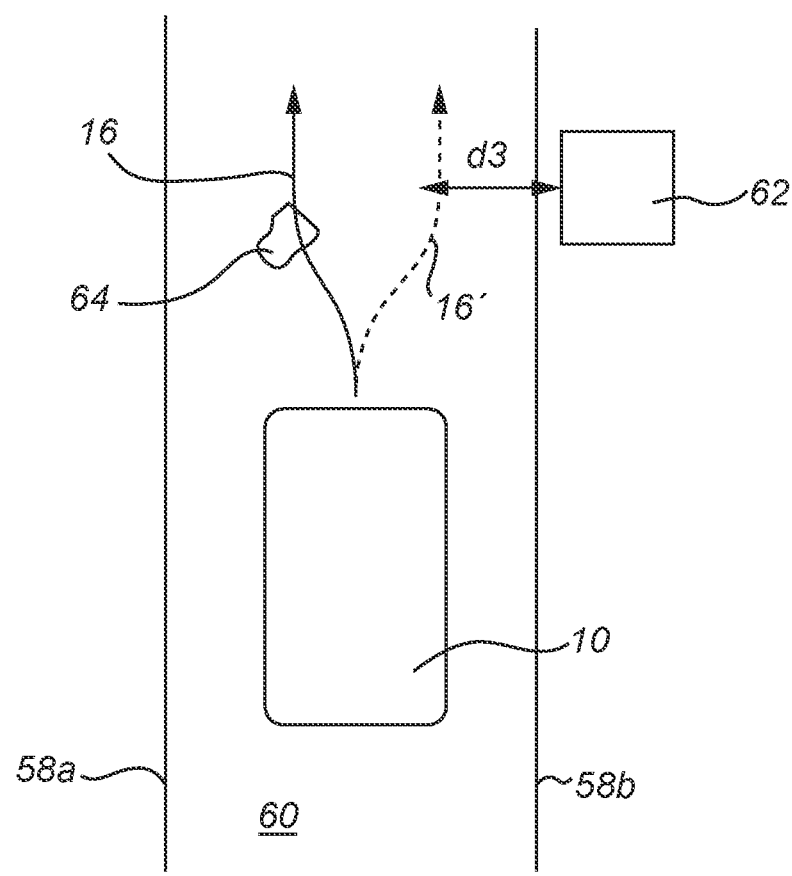

In another example illustrated in FIG. 4d, a constraint can be a change in a hierarchy of rules within an online motion planner 18. For example, in normal operation (trajectory 16)

a rule to stay within the markings 58*a-b* of a lane 60 could be higher than a rule to keep at least 100 cm of distance d3 between a vehicle 10 and an object 62 next to the lane 60, and both are higher than avoiding a pothole 64.

An input from the remote operator 20 can be to avoid a particular upcoming pothole 64 which is next to a stationary object 62 and where it is not possible to both stay at least 100 cm from the object 62 and avoid the pothole 64. This can be converted into a nudge 46 which is, for a location around the specific pothole 64, an increase in the importance of the existing pothole avoidance rule to then become higher in the hierarchy than keeping 100 cm of distance between the vehicle 10 and object 62 next to the lane 60 but still lower than the rule to stay within the markings 58*a-b* of the lane 60, resulting in updated trajectory 16'. There can be different nudge types. For example, this can be a reduce obstacle margin nudge type.

A nudge 46 can also be formulated so that a hierarchy of rules stays the same, but for a location around a specific pothole 64, a rule to keep at least 100 cm of distance d3 between a vehicle 10 and an object 62 has a parameter reduced from 100 cm to 50 cm, so that the vehicle 10 can avoid the pothole 64.

Similarly, instead of a nudge 46 being location specific, it can instead be time specific or a combination of location and time.

Furthermore, notwithstanding the nudge 46, the online motion planner 18 would still be operating the vehicle 10 in accordance with the remaining rules/constraints. As such, if avoiding the pothole 64 would still require the vehicle 10 to deviate from the markings 58*a-b* of the lane, then even though there was a nudge 46 to avoid the pothole 64, for example by changing a cost function to increase a cost of driving close to the pothole, the higher rule/constraint would still be in place, for example being represented in the cost function as if deviating from the markings of the lane was significantly more costly than avoiding the pothole, and the vehicle 10 would not avoid the pothole 64 in order to satisfy the higher level rule.

Other constraints can include:
Aggressiveness of a vehicle 10, for example relative aggressiveness of maneuvering of the vehicle 10, resulting in causing the vehicle 10 to behave more or less aggressively in a situation or set of situations indicated by a nudge 46. A vehicle 10 can for example be nudged to be more aggressive in an uncertain situation, e.g., by the remote operator 20 pressing a throttle of equipment 38 of a remote station 12. Aggressiveness can here be seen as the inversion of "perceived safety", although the vehicle 10 will never do something unsafe. For example, a nudge can reduce a safety margin for a specific event, location, time, environmental state or other occurrence without violating an action constraint, for example running into an obstacle.

Aggressiveness can be a constraint related to a specific element or a specific combination of elements. For example, aggressiveness can be linked to one or more safety margin factors in a cost function. An operator can select to adjust an aggressiveness of a vehicle which will in turn modify the linked safety margins accordingly. Elements related to aggressiveness can be predetermined. Elements related to aggressiveness can be adjusted before, during, and/or after operation of a vehicle.

Stopping time and/or stopping distance of a vehicle 10, for example stopping time, distance and/or rate of the vehicle 10 in a normal and/or emergency situation, resulting in a braking function of the vehicle 10 operating in a different manner indicated by a nudge 46.

Risk, for example encouragement to overtake or avoid overtaking another vehicle. A vehicle 10 can for example be nudged to avoid overtaking in response to a remote operator 20 assessing from sensor data 44 that a road the vehicle 10 is currently travelling on is slippery. Contrary, a vehicle 10 can be nudged to encourage overtaking in response to a remote operator 20 assessing from sensor data 44 that the vehicle 10 is currently travelling on a dry and open road.

Risk can be a constraint related to a specific element or a specific combination of elements. For example, risk can be linked to all safety margin factors of the cost function, such that said factors can be modified together.

Risk can be linked to one or more models used by a motion planner to determine possibility or likelihood of certain events. For example, risk can be linked to a predictive path algorithm that can estimate the likelihood of a pedestrian crossing a crossing as well as one or more other models. An operator can modify safety margins used by all linked models by modifying risk. A remote operator can modify thresholds used by models by modifying risk.

In another embodiment/example, a vehicle 10 can send a specific query, e.g., there is an object lying across a road in such a way that it is impossible to find a trajectory which goes past the object without driving over the object. Information on the object (photo, 3D rendering, lidar data, video etc.) can be sent to a remote operator 20. The remote operator 20 can determine if it is a garbage bag which can be driven over or if it is a person laying in the road that should be avoided. Without the supervision, an online motion planner 18 of the vehicle 10 would stop the vehicle and it would not be able to progress forward. It would simply wait to be taken over by a remote operator 20. The remote operator 20 can see that it is a person and take over control or send a command (taking over control and exiting an autonomous mode or a supervised autonomous mode) to stop. The remote operator 20 can also simply select a button (of equipment 38) which indicates that the specific object is something which can be driven over. This can be as simple as a pop-up window coming to the remote operator 20 with a green checkbox or a red x. If the remote operator 20 selects the green checkbox then computer device 66 creates a nudge 46. The nudge 46 can be what is sent to the vehicle's online motion planner 18 which allows the vehicle 10 to continue on past the object without the need for any commands from the remote operator 20, meaning that the vehicle has remained and continuously operated in a supervised autonomous mode.

In this scenario it can be that the vehicle 10 sends an object identifier along with information on the object.

A nudge 46 can be a classifier to go with an object identifier.

A classifier can indicate that an object should be avoided if possible, but if not possible it can be driven over. That information can then be used in normal operation of an online motion planner 18 such that a vehicle 10 is able to move on since a blocking situation has now been removed due to a classification/reclassification of the object.

A remote operator 20 can also have the opportunity to provide more information to a computer device 66 on how future same/similar events are to be handled. This can then be used to determine the form a nudge 46 will take. For example, an input from a remote operator 20 in the example above could be simply a green check box indicating that the specific object can be driven over this one time. The nudge 46 can then be a classification of the object associated with the object identifier.

In an example where a remote operator 20 knows that the vehicle 10, or another vehicle, is likely to encounter that object again and should treat it the same way, the nudge 46 can take a different form. In such an example, location/mapping data can be included with object information (e.g. what the object looks like and where it is) as well as classification data.

This can be sent to one or more vehicles or it can be included with map data which can be accessible to one or more vehicles.

This can remain valid for a set amount of time or for a variable amount of time. In such an example, at future times future vehicles who encounter the same (or similar) object at the same location (or within a proximity of the same location) will have (or have access to) the classification data to know that the object should be avoided if possible but can be driven over if avoidance is not possible or otherwise problematic.

Figure 5:
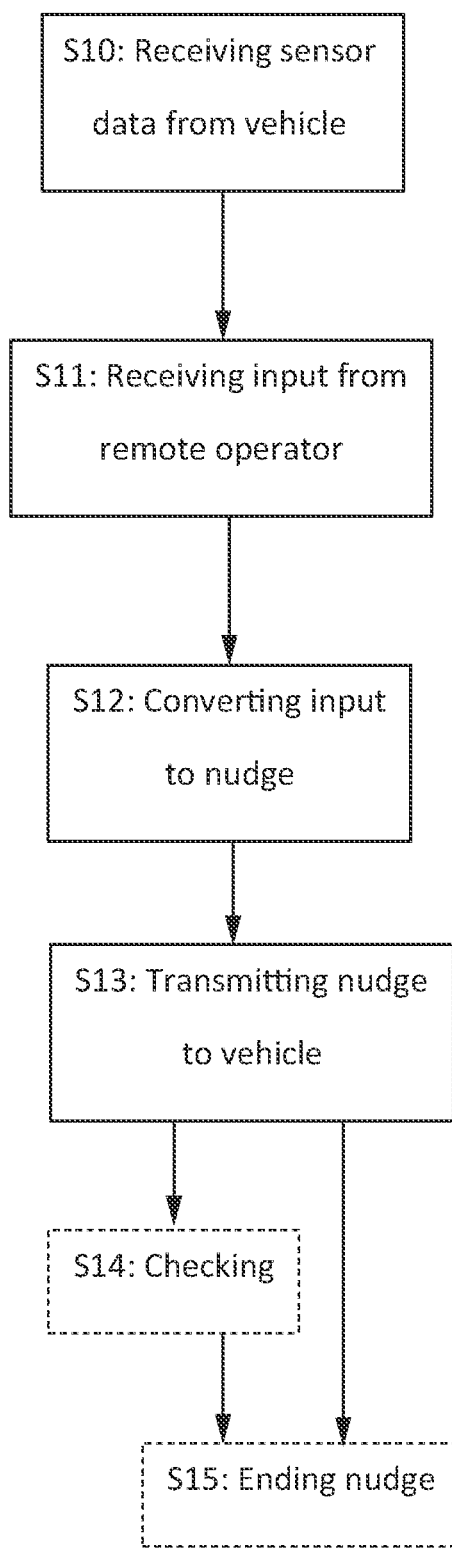
FIG. 5 is a flow chart of a method.

Turning to FIG. 5, FIG. 5 is a flow chart of a method interrelated to the method of FIG. 3, but from the remote station 12's perspective.

At S10, this method can comprise receiving, at a station 12 remote from a vehicle 10, vehicle data, sensor data 44 and/or information from the vehicle 10 while operating in a supervised autonomous drive mode. For example, the remote station 12 can receive the sensor data 44 sent in step S2. Sensor data 44 can be received via communication means 40.

At S11, the method can include receiving an input from a remote operator 20 at a remote station 12 to influence an upcoming attribute (e.g., the path and/or speed profile) of a trajectory of a vehicle 10 while continuing to operate in the supervised autonomous drive mode, which input from the remote operator 20 can be based on received sensor data 44.

Input can be entered by a remote operator 20 using any input means of remote station equipment 38, such as a keyboard or keypad, computer mouse, touch screen, joystick, steering wheel, etc.

Received input can be converted at S12, for example by a computer device 66, into a corresponding nudge 46 for an online motion planner 18 controlling the vehicle 10 in a supervised autonomous mode.

For example, a remote operator 20 pressing a throttle of equipment 38 can be translated into a nudge 46 indicating that aggressiveness of the vehicle 10 should be temporarily increased.

In another example, a remote operator 20 steering left with a steering wheel of equipment 38 (or pressing left with a joystick of equipment 38) can be translated into a nudge 46 changing the lateral intention of a vehicle 10, which could result in an updated, more left trajectory 16'. However, it should be noted that steering/pressing left is not a direct command to the vehicle 10 to steer left; it is still up to the vehicle 10 and/or the motion planner to decide, using a cost function based model, whether or not it should travel in a more left trajectory taking into account all circumstances, similar to the discussion in relation to FIG. 4a.

A nudge 46 can be transmitted (S13) to a vehicle 10, e.g., using communication means 40. It should be appreciated that the steps S10-S13 can be performed during the aforementioned steps S1-S2 and before step S3.

At optional step S14, a remote station 12 can check that a vehicle 10 correctly changed its driving behavior in accordance with a nudge 46.

Checking can be in the form of presenting one or more trajectories from a motion planner without a nudge and one or more trajectories from a motion planner with a nudge. Additionally, there could be multiple nudges and trajectories presented from the multiple nudges. For example, more than one nudge can be input provided at a same or overlapping time frame. At the remote station the trajectories could then be checked to see if a nudge had a desired outcome or if one nudge or combination of nudges was superior to another.

Checking can be achieved by a remote operator providing an input to a remote station after a nudge is transmitted.

Checking can be achieved by a remote station and/or motion planner comparing a simulated model of a vehicle following a trajectory with actual data from the vehicle to determine if the vehicle followed the trajectory.

At optional step S15, a nudge 46 can be ended, for example when a remote operator 20 releases a used input means of remote station equipment 38, for example as discussed in relation to step S6.

Figure 6:
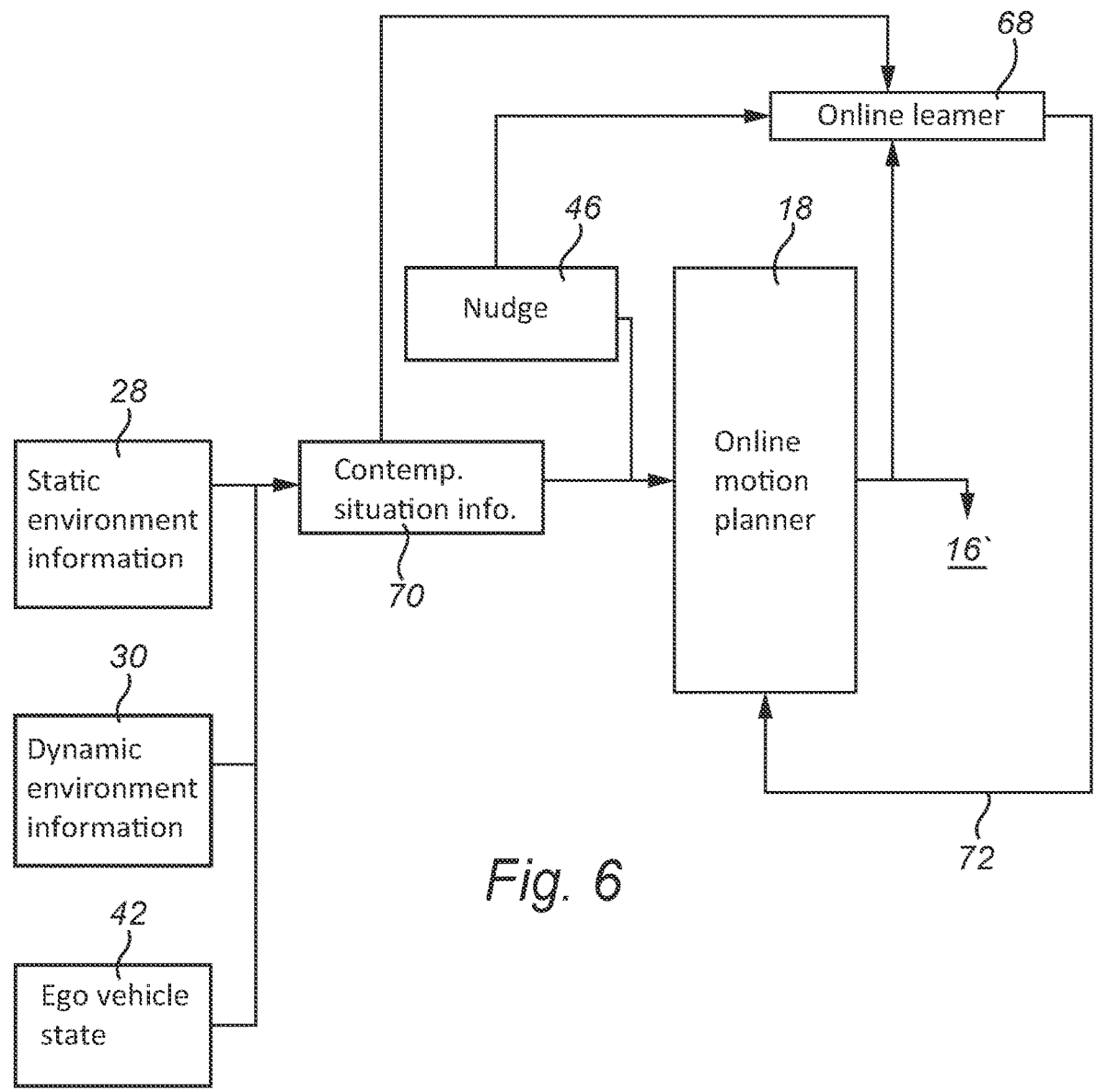
FIG. 6 is a partial block diagram of the vehicle with an online learner module.
Figure 7:
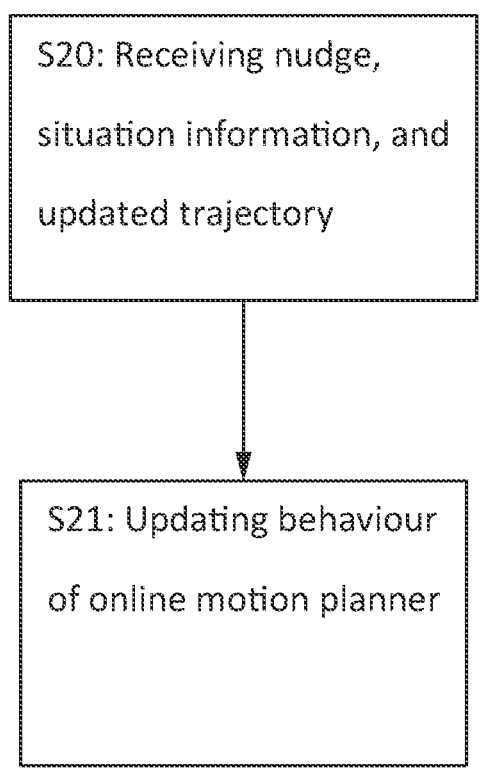
FIG. 7 is a flow chart of a method.

Moving on to FIGS. 6-7, a vehicle 10 and/or a motion planner can further include an online learner module 68.

The terms online learner, online learner module, and learner module can be used interchangeably.

An online learner 68 can be hardware, software, or a combination thereof. An online learner 68 can in operation receive (S20) a nudge 46 originating from a remote station 12, contemporary situation information 70 of a vehicle 10 operating in a supervised autonomous drive mode, and an updated trajectory 16' from an online motion planner 18. This nudge 46 can be the nudge from step S3/S13. Contemporary situation information can be static environment information 28, dynamic environment information 30, and/or ego vehicle state 42 at a specific and/or selectable time before, during, and/or after the nudge was created. The updated trajectory 16' in S20 can be the updated trajectory 16' from step S4.

An online learner 68 can update (S21) the permanent or long-term or normal behavior of an online motion planner 18 at least based on a nudge 46, contemporary situation information 70, and an updated trajectory 16', as indicated by reference sign 72 in FIG. 6. Thereby, an online learner 68 can retrain an online motion planner 18 to include new behavior based on an operator nudge 46 as a normal behavior. So, the next time the vehicle 10 in autonomous drive mode or supervised autonomous drive mode encounters a situation that caused a remote operator 20 to nudge it before, the vehicle 10 can already act as the remote operator 20 suggested without a remote operator 20 having to nudge the vehicle 10 again.

In step S21, an online motion planner 18 can be continuously refined based on updated mapping data, onboard sensor data from a vehicle 10, external sensor data from other vehicles, and/or other external data.

Onboard sensor data from a vehicle 10 can be data collected by onboard sensors 24, such as camera data, radar data etc.

External sensor data from other vehicles can be data collected from sensors from other vehicles.

Other external data can e.g., include simulation data.

The possibility for a vehicle 10 and/or online motion planner 18 to learn new behavior from human interventions as in steps S21-S22 will reduce the number of situations where a human operator 20 needs to assist the vehicle 10. Furthermore, the increase in autonomous driving capability over time results in less need for human monitoring. It also removes the need for offline annotation of situations typically used for training.

Furthermore, steps S21-S22 can be repeated for several nudges 46 and corresponding updated trajectories 16', to retrain an online motion planner 18.

More examples of supervised autonomous modes are disclosed in more detail below. A supervised autonomous mode can be where an operator is capable of providing an input to a system which is capable of influencing the system but, for example, not directly controlling a vehicle.

Operating a vehicle in a supervised autonomous mode can include a number of steps.

A step can be receiving a first set of vehicle data at a remote station. Vehicle data can be, for example, vehicle sensor data. Vehicle data can be video feed from the vehicle, for example from one or more cameras located on a vehicle. Vehicle data can be Lidar data. Vehicle data can also be video feed from an external source which shows a vehicle. For example, in an environment with CCTV cameras, said cameras can show a supervisor an area of operation which includes a vehicle.

Vehicle data, and/or vehicle sensor data, can include location data. For example, location data can indicate the exact, and/or relative location of a vehicle in an environment. Location data can be GPS data. Location data can be satellite positioning data. Location data can be triangulation data. Location data can be trilateration data.

Vehicle data can be information about a state of a vehicle or its surroundings. For example, information can be a weather forecast or a report indicating temperature and/or humidity in a vehicle's surroundings. Information can be a report of a traffic jam ahead of a vehicle. Information can be a report of an accident having occurred ahead of a vehicle.

According to an example, vehicle data can be data which is sufficient for a remote operator and/or a remote supervisor to be able to monitor, supervise, and/or control the operation of a vehicle.

Vehicles can be configured to operate in an autonomous mode.

Vehicles can also be configured to operate in additional modes, for example a supervised autonomous mode, a remote operated mode, or a manual driven mode.

Vehicles operating in an autonomous mode, or for example a supervised autonomous mode, can follow a trajectory determined by a motion planner.

Trajectories can include information on a direction or path that a vehicle should follow. Trajectories can include a speed profile indicating how a vehicle should travel a direction or a path with respect to time. Trajectories can include information on how a vehicle should accelerate or decelerate. Trajectories can include information on if a vehicle should overtake another vehicle or not. Trajectories can include information on how a vehicle should overtake another vehicle. Trajectories can include information on a steering angle of a vehicle. Trajectories can include information on a turning radius of a vehicle. Trajectories can include information on how a steering angle or turning radius of a vehicle changes over time. Trajectories can include information on a yaw rate of a vehicle. Trajectories can include information on power transfer to individual wheels.

According to an example, trajectories include information instructing a vehicle how it should drive on a road.

A motion planner can be included in a vehicle. A motion planner can be included in a second vehicle. A motion planner can be included in a cloud system.

A motion planner can be considered as a computer or a control unit that is connected to a vehicle and a remote station, but not necessarily physically part of either of the two.

Motion planners can use a cost function based model. A cost function based model can be used in combination with vehicle data. A cost function based model can be used in combination with vehicle data collected at different times. A cost function based model can include a cost function.

A cost function can include one or more elements.

An element can be a factor of a cost function.

A factor can be an attribute of a vehicle. A factor can be a relationship between a vehicle and its surroundings. A factor can be a relationship between a vehicle and another vehicle.

For example, a factor can be the speed of a vehicle. A factor can be an acceleration or deceleration of a vehicle. A factor can be the steering angle of the vehicle. A factor can be the yaw rate of a vehicle. A factor can be the distance between a front end of a vehicle and a stop sign or another vehicle. A factor can be a relative speed between a vehicle and another vehicle. A factor can be a distance between a vehicle and a marking on a road, for example the centerline of a road. A factor can be a distance between a vehicle and a curb or road boundary. A factor can be humidity of the air. A factor can be wind speed and/or wind direction. A factor can be tire pressure. A factor can be tire temperature. A factor can be brake temperature. A factor can be a state of charge of a battery of a vehicle. A factor can be the temperature of a battery of a vehicle. A factor can be load distribution. A factor can be axle load. A factor can be wheel rotation speed. A factor can be traction for a specific wheel. A factor can be traction for a wheel axle or a set of wheels. A factor can be related to traction, for example the total traction of all wheels.

A factor can be a value determined based on sensor data. For example, a factor can be wheel slip, which can be based on sensor data from for example, one or more wheel speed sensors.

A factor can be an estimated value, for example an estimated braking distance. A factor can be a determined and/or calculated possibility, such as a likelihood of an identified pedestrian crossing the road ahead of a vehicle.

A factor can be a representation and/or an aggregation of a combination of inputs and/or variables. For example, vehicle characteristics such as tire pressure and load distribution in combination with weather data can be combined to form an estimated brake distance factor.

An element can be a weighting of a factor used in a cost function.

A weighting of a factor can be an indicator of the importance of said factor relative to other factors of a cost function. A weighting of a factor can be a safety margin factor. For example, a motion planner can use a certain safety margin factor for the weighting of a factor or factors corresponding to overtaking another vehicle, such that a cost of overtaking in an autonomous mode is higher than in a supervised autonomous mode.

A weighting of a factor can be a weight used in a cost function to determine an optimal solution of a trajectory.

A weighting of a factor can be a weight used in a cost function to determine an optimal solution of a trajectory in a multi-objective optimization problem.

A weighting of a factor can be a weight used in a cost function to determine an optimal solution of a trajectory along a Pareto front.

A step can be presenting a received first set of vehicle data at a remote station.

A remote station can include a display device. A display device can be capable of presenting a video feed. A display device can be capable of presenting a user interface.

A remote station and/or a display device can include a speaker. A remote station and/or a display device can include a haptic feedback control. A remote station and/or a display device can include one or more of a visual, sound, or other sensory presenting device.

A step can be receiving a supervisor input from a supervisor input device at a remote station upon having presented a first set of vehicle sensor data.

A supervisor input device can be a keyboard. A supervisor input device can be a mouse. A supervisor input device can be a joystick. A supervisor input device can be a wheel. A supervisor input device can be a pedal. A supervisor input device can be a button. A supervisor input device can be a lever. A supervisor input device can be a control knob.

A supervisor input device can allow a human supervisor to provide an input to a remote station.

A step of the supervised autonomous mode can be converting a
    supervisor input into a nudge for a motion planner of a vehicle associated with the received first set of vehicle sensor data, wherein the nudge at least includes information on how to modify one or more elements of a cost function of the motion planner.

A nudge can include Information on how to modify an element of a cost function of a motion planner, for example how a weighting of a factor of a cost function should be increased or decreased. Information can include a factor of a cost function that should be removed, and/or a new factor of a cost function that should be added. Information can include a duration of a modification before an element is reset.

Information on how to modify an element can include a manner in which the element is reset from its modified state to an original state. A manner can be instantaneously, linearly decreasing, linearly increasing, exponentially decreasing, or exponentially decreasing.

For example, a weighting of a factor of the cost function that has been increased can be set to return to its original value in a linear manner over a specific period of time, or it can be set to return in an exponential manner, or instantaneously. A factor that has been removed can be instantaneously added upon resetting the modification, or it can be added with a modified factor for a limited period of time before being completely reset.

Two or more elements of the cost function can have a fixed relationship, so that modifying one of the elements also modifies the related element(s).

For example, weighting of two factors can be linked such that one is increased when the other is decreased, or vice versa. Weighting of two factors can be linked such that one is increased when the other is increased. Weighting of two factors can be linked such that one is decreased when the other is decreased. Two elements can be linked such that removing one of the elements also removes the other. Two elements can be linked such that adding one of the elements also adds the other.

Two or more elements of the cost function can have a fixed priority ranking, such that one of the elements cannot be modified beyond a certain extent determined by the other element(s). For example, how much a weighting of a factor can be increased or decreased can be limited by one or more other factors and/or weights, such that a cost function will never lead to a trajectory that is dangerous and/or violates regulations.

Converting a supervisor input into a nudge can include mapping a specific supervisor input to a specific element or combination of elements of a cost function of a motion planner. A conversion can include modifying a specific element or combination of elements by a variable amount based on a supervisor input.

For example, if a supervisor presses a button at a remote station, this can correspond to a modification of a specific element of a cost function such as a weighting of factors corresponding to a cost of overtaking a vehicle, so that these factors are modified by a predetermined amount to reduce a total cost of overtaking in the model.

In another example, if a supervisor moves a lever or turns a control knob, with multiple discrete steps or with stepless adjustment, a weighting of one or more factors can be increased or decreased accordingly within a predetermined interval.

How a specific supervisor input from a supervisor input device can be converted into a nudge can be determined by simulating different modifications or combinations of modifications, and evaluating the outcome of the simulations in order to determine which modifications have a correlation with certain actions and/or which modifications that are related to each other. It can also be determined by performing tests with one or more vehicles.

A step can be transmitting a nudge from a remote station to a motion planner.

A remote station can include a receiver and a transmitter. A remote station can include a transceiver. A nudge can be transmitted electronically using wired or wireless communication.

A step can be at least temporarily updating a cost function based model of a motion planner based on a nudge.

A cost function can be updated by modifying elements of the cost function in accordance with modifications indicated in a nudge. A cost function can be updated for a predetermined period of time. A cost function can be updated for a time that can be selected by a supervisor at a remote station.

A cost function can be updated permanently or without a time limit, so that the cost function will remain unchanged after the update until a further nudge is received, or an update is provided by other means.

A cost function can be updated at least temporarily so that subsequent trajectories for a vehicle determined by a motion planner are based on, but not directly controlled by, a supervisor input. In this way, a supervisor does not send an explicit command to a vehicle which the vehicle must follow. Instead, a supervisor can update a motion planner's model to influence how certain characteristics of a vehicle and/or a vehicle's surroundings can be interpreted by the motion planner when said motion planner determines a trajectory for the vehicle to follow.

Thus, the supervisor does not command or control the vehicle. Rather, the vehicle remains in supervised autonomous mode, which can correspond to an autonomous drive mode that is supervised by the supervisor, such that the vehicle and/or the motion planner remain in control of any decision making of the vehicle and how it should drive and/or operate. In this sense, the vehicle can be considered to be responsible for any of its actions while in an autonomous drive mode and/or a supervised autonomous drive mode. This can mean that there is no need for a handover procedure between a remote human operator and the vehicle and/or the motion planner. Thus, operational stability can be improved.

Updating a cost function based model of a motion planner can include continuously presenting trajectories for a vehicle at a remote station, receiving input from a supervisor using a supervisor input device, converting the input into a nudge, transmitting the nudge to a motion planner, and updating a cost function based model of the motion planner based on the nudge until a supervisor confirmation input is received using the supervisor input device.

Thus, a supervisor can provide nudges to a motion planner without a model of the motion planner providing trajectories based on the nudges until the supervisor has determined that the model has been updated in a satisfactory manner. In other words, a motion planner can provide simulated representations of how an updated trajectory would influence a vehicle. This can allow a supervisor to add, remove, increase, decrease, and/or modify one or more inputs before an updated model provides any trajectories to a vehicle based on the updated model.

In this mode, a motion planner can use an unmodified model to provide trajectories to a vehicle while a supervisor is presented with simulated trajectories of an updated model. Thereby, a vehicle can still receive trajectories from an unmodified model of a motion planner while a supervisor is updating a new updated model with simulated trajectories. An unmodified model can be, for example, a model used immediately before a supervisor provided an input.

For example, a supervisor can provide input by turning a steering wheel at a remote station in a counterclockwise direction which can be converted into a nudge and sent to a motion planner. A motion planner can send an updated trajectory based on a nudge to the remote station. A remote station can present an updated trajectory, for example as a simulation or an overlaid image on a screen. If a supervisor determines that a trajectory is not updated in a satisfactory manner, the supervisor can modify an input, such as turning a steering wheel further in a counterclockwise direction. A supervisor can provide a confirmation input when a presented, simulated, trajectory is satisfactory. An updated trajectory can then be sent to the vehicle.

A step can be continuously operating a vehicle in the supervised autonomous mode, wherein the vehicle autonomously follows trajectories from a motion planner continuously before and after receiving a nudge.

Continuously operating a vehicle in a supervised autonomous mode can include the vehicle not exiting the supervised autonomous mode. It can include the vehicle not entering a remote controlled mode or an operator controlled mode, in which a remote operator directly commands the vehicle.

Continuously operating a vehicle in a supervised autonomous mode can include the vehicle remaining in control of all decision making at all times, so that any input from a supervisor is not a direct command to the vehicle.

Continuously operating a vehicle in a supervised autonomous mode can include that the vehicle autonomously follows trajectories from a motion planner. A vehicle can continuously follow trajectories from a motion planner before, during and after receiving a nudge. For example, a supervisor input which leads to a nudge is capable of influencing trajectories from a motion planner without taking over control from an autonomous system. Therefore, a motion planner can periodically receive nudges without a break in control of a vehicle in an autonomous mode.

Continuously operating a vehicle in a supervised autonomous mode can include the vehicle remaining in an autonomous mode that is supervised by the supervisor, such that the vehicle and/or a motion planner remain in control of any decision making of the vehicle and how it should drive and/or operate. In this sense, a vehicle can be considered to be responsible for any of its actions while in a supervised autonomous drive mode. Furthermore, this can also mean that there is no need for a handover procedure between a remote human operator and a vehicle and/or a motion planner. Thus, operational stability can be improved.

A motion planner can include a learner module. A learner module can be based on the same hardware and/or software system as a motion planner. A learner module can be based on a hardware and/or software system that is remote from, but connected to, a motion planner.

A learner module can be arranged to receive a nudge. A learner module can be arranged to receive an updated cost function based model of a motion planner corresponding to a nudge.

A learner module can be arranged to receive vehicle data corresponding to a predetermined time before and after a nudge was created. A predetermined time can be a fixed time or a variable time. A learner module can determine a predetermined time for individual nudges.

A learner module can be arranged to receive trajectories provided by a motion planner corresponding to a predefined time before and after a nudge updated a cost based model of the motion planner. A predetermined time can be a fixed time or a variable time. A learner module can determine a predetermined time for individual updates.

A learner module can analyze how a vehicle responded to modifications indicated by a nudge and/or an updated cost function based model of a motion planner based on vehicle data and/or trajectories.

A learner module can be arranged to update a normal state of a motion planner in accordance with a nudge based on vehicle data and trajectories received by a learner module.

A learner module can be arranged to update a normal state of a motion planner based on an analysis of how a vehicle responded to modifications indicated by a nudge and/or an updated cost function based model of the motion planner based on vehicle data and/or trajectories.

A normal state of the motion planner can be how a cost function of a motion planner is configured without the motion planner having received a nudge. A normal state can be how a cost function of the motion planner is configured when resetting the model.

A learner module can be considered to be used for more long term updates of a cost function based model of a motion planner, and/or for being used to update a cost function based model of a motion planner that is intended to provide trajectories for multiple vehicles.

One or more of the steps above can be performed by a system comprising a computer. A system can comprise a vehicle configured to operate in an autonomous drive mode and/or a supervised autonomous drive mode in which the vehicle follows a trajectory determined by a motion planner.

One or more of the steps can be stored as instructions on a computer readable storage medium that when read by a computer causes the computer to perform said steps.

Additional examples of a computerized method of operating a vehicle with autonomous driving capability are disclosed below. Steps described below can be used together with or in place of steps described above.

A step can be operating a vehicle in an autonomous drive mode where at least steering, braking and acceleration decisions are made autonomously, and wherein the vehicle follows a trajectory from an online motion planner.

A step can be sending sensor data and/or information from a vehicle to
a remote station while the vehicle is operating in an autonomous drive mode.

A step can be receiving a nudge from a remote station based on sensor data and/or information, wherein the nudge is an input to an online motion planner.

A step can be determining in an online motion planner an updated trajectory for a vehicle in an autonomous drive mode based at least on a nudge and on sensor data from the vehicle, wherein the nudge at least temporarily modifies at least one constraint within the online motion planner.

A step can be continuously operating a vehicle in an autonomous drive mode by following an updated trajectory from an online motion planner.

A vehicle can operate continuously in an autonomous drive mode, without direct driving instructions from a remote operator, by following a regularly updated trajectory from an online motion planner.

A nudge can be an input to a motion planner, in which the nudge is not a direct command to a vehicle.

A nudge can be received in real time while a vehicle is operating in an autonomous drive mode.

A nudge can be based on input from a remote operator/supervisor, which input from the remote operator can be based on sensor data and/or information.

An at least temporarily modified at least one constraint can be a change to a cost function of an online motion planner.

A nudge can include an indication of a constraint to be modified and/or a manner in which to modify a constraint.

A constraint can be relative aggressiveness of maneuvering of a vehicle. A nudge can result in causing a vehicle to behave more or less aggressively in a situation or set of situations indicated by the nudge.

A constraint can be margin to one or more vehicles and/or object(s). A nudge can result in a vehicle travelling closer to or avoiding at a greater distance one or more vehicles and/or object(s) indicated by the nudge.

A constraint can be stopping time, distance and/or rate of a vehicle in a normal and/or emergency situation. A nudge can result in a braking function of the vehicle operating in a different manner indicated by the nudge.

A constraint can be encouragement to overtake or avoid overtaking another vehicle.

A nudge can result in a risk function of an online motion planner being influenced by the nudge.

A constraint can be a safety margin for another object's potential movement.

A nudge can result in a predictive path algorithm of an online motion planner being influenced by the nudge.

A vehicle can be a road vehicle, a heavy duty truck, an electric truck, an electric heavy duty truck, a tractor, or a tractor-trailer combination.

A step can be continuously refining a motion planner based on received nudges, updated trajectories, contemporary situation information of a vehicle, updated mapping data, onboard sensor data from a vehicle, external sensor data from other vehicles, other external data, or any combination of thereof.

A step can include receiving, at a station remote from a vehicle capable of operating in an autonomous drive mode, sensor data and/or information from the vehicle while operating in an autonomous drive mode.

A step can include receiving an input from a remote operator at a remote station to influence an upcoming attribute of a trajectory of a vehicle while continuing to operate in an autonomous drive mode, which input from the remote operator is based on received sensor data and/or information.

A step can include converting a received input into a corresponding nudge for a motion planner controlling a vehicle in an autonomous mode.

A step can include transmitting a nudge to a vehicle and/or motion planner.

A nudge can indicate a change to a cost function of a motion planner and/or one or more constraints of a motion planner.

A step can include checking, at a remote station, that a vehicle changed its driving behavior in accordance with a nudge.

A remote station can be configured to perform one or more of the above-mentioned steps.

The ordinarily skilled person in the art realizes that the present invention by no means is limited to the embodiments described above. The features of the described embodiments can be combined in different ways, and many modifications and variations are possible within the scope of the appended claims. The word "comprising" does not exclude the presence of other elements or steps than those listed in the claim. The word "a" or "an" preceding an element does not exclude the presence of a plurality of such elements.

An aspect/embodiment of the present invention can be a method of maintaining a continuous autonomous drive mode under supervision of a remote operator 20, wherein the remote operator 20 can make intuitive inputs which are translated into nudges 46 which affect future decisions in an online motion planner 18 of a vehicle 10 at a future time. This can provide a bridge technology for an online motion planner which is relatively simple/rigid to handle decisions which require higher levels of complexity and/or deviation from standard rules.

What is claimed is:
1. A method of operating an autonomous vehicle in a supervised autonomous mode, comprising:
receiving, by a remote computer in a remote station of an autonomous vehicle system, a first set of vehicle data from a vehicle computer in the autonomous vehicle system, the vehicle computer is in a vehicle being operated in the supervised autonomous drive mode following a trajectory determined by a motion planner model being executed by the vehicle computer in combination with state information of the vehicle;
displaying, by the remote computer in the remote station, the received first set of vehicle data in a user interface displayed on a display at the remote station;
receiving, by the remote computer in the remote station, a supervisor input from a supervisor input device via the user interface displayed on the display at the remote station;
converting, by the remote computer in the remote station, the supervisor input into a nudge associated with the received first set of vehicle data, wherein the nudge at least includes information on how to modify one or more elements of a cost function of the motion planner model being executed by the vehicle computer;
transmitting remotely, by the remote computer in the remote station, the nudge from the remote station to the vehicle computer in the vehicle;

updating, by the vehicle computer in the vehicle, the cost function of the motion planner model being executed by the vehicle computer, based on the nudge; and continuously operating, by the vehicle computer in the vehicle, the vehicle in the supervised autonomous mode based on the updated cost function, wherein the continuously operating causes the vehicle to autonomously follow trajectories from the motion planner model continuously before and after receiving the nudge, wherein the information on how to modify one or more elements of the cost function included in the nudge includes one or more of:
   a duration of modification to the one or more elements before the one or more elements are reset, and
   a manner in which the one or more elements are reset from its modified state to its original state.

2. The method according to claim 1, wherein the one or more elements of the cost function of the motion planner model include weighting of one or more factors of the cost function.

3. The method according to claim 1, wherein the motion planner model is executable by a computer remote from the vehicle.

4. The method according to claim 1, wherein the vehicle computer further includes a learner module configured to perform the steps of:

receiving the nudge;
receiving a second set of vehicle data corresponding to a first predefined time, wherein the first predefined time is a time period before and after the nudge was created;
receiving one or more trajectories determined by the motion planner model corresponding to a second predefined time, wherein the second predefined time is a time period before and after the nudge updated the cost function of the motion planner model; and
updating a normal state of the motion planner model in accordance with the nudge based on the second set of vehicle data and the one or more trajectories received by the learner module.

5. The method according to claim 1, wherein the step of continuously operating the vehicle in the supervised autonomous drive mode includes controlling, by the vehicle computer, decision making for the vehicle without input from the remote computer.

6. The method according to claim 1, wherein the first set of vehicle data includes one or more of:
   sensor data from the vehicle;
   sensor data from another vehicle;
   sensor data from a sensor in the vehicle's surroundings; and
   the state information of at least one of the vehicle and surroundings of the vehicle.

* * * * *